United States Patent
Lo

[11] Patent Number: 6,072,471
[45] Date of Patent: Jun. 6, 2000

[54] AMBIDEXTROUS UPRIGHT COMPUTER MOUSE

[76] Inventor: Jack Lo, 1415 Eddington La., Daly City, Calif. 94014

[21] Appl. No.: 08/932,115

[22] Filed: Sep. 17, 1997

[51] Int. Cl.[7] .................................................. G09G 5/08
[52] U.S. Cl. ......................... 345/163; 345/165; 345/167; 341/20
[58] Field of Search ..................... 345/163, 164, 345/165, 166, 167, 156, 157; 341/20

[56] References Cited

U.S. PATENT DOCUMENTS

| D. 328,597 | 8/1992 | Clouss | D14/114 |
|---|---|---|---|
| 4,862,165 | 8/1989 | Gart | 341/20 |
| 5,355,147 | 10/1994 | Lear | 345/156 |
| 5,428,368 | 6/1995 | Grant | 345/163 |
| 5,432,510 | 7/1995 | Matthews | 341/20 |
| 5,576,733 | 11/1996 | Lo | 345/163 |
| 5,648,798 | 7/1997 | Hamling | 345/163 |
| 5,726,683 | 3/1998 | Goldstein | 345/163 |
| 5,841,425 | 11/1998 | Zenz, Sr. | 345/163 |

*Primary Examiner*—Dennis-Doon Chow
*Assistant Examiner*—Fritz Alphonse
*Attorney, Agent, or Firm*—Jack Lo

[57] ABSTRACT

An ambidextrous upright computer mouse includes a relatively upright finger engaging side on one side, and a thumb engaging side on an opposite side. Two sets of buttons are positioned at opposite ends of the finger engaging side. The mouse is symmetrical about a vertical transverse medial plane. When the finger engaging side is on the right side, the mouse can be grasped by a right hand. When the mouse is rotated so that the finger engaging side is on the left side, it can be grasped by the left hand. There is always a set of buttons at the forward end of the mouse, regardless of its orientation. Only one set of buttons is enabled at any time. The sets of buttons are alternately enabled and disabled by moving a selector switch. Ambidexterity is provided without compromising feel and comfort for either hand.

15 Claims, 5 Drawing Sheets

AMBIDEXTROUS UPRIGHT COMPUTER MOUSE

BACKGROUND OF THE INVENTION

1. Field of the Invention

This invention relates generally to computer mice.

2. Prior Art

A conventional computer mouse includes a generally horizontal finger supporting or engaging top surface. To grasp the mouse, a hand must also be in a matching horizontal position, which requires the wrist and forearm to be twisted up to 90 degrees from a neutral position. Other subtle deviations of the hand and arm are also required. An occasional mouse user may not notice any discomfort. However, heavy mouse use is commonly associated with graphical user interfaces, such as "MICROSOFT WINDOWS." Also, intensive mouse activity is required in image editing, drafting, gaming, and Web surfing. Therefore, more and more computer users are becoming heavy mouse users. In the long term, what seems to be minor twisting of the hand and arm can often result in moderate to sever discomfort, pain, and even injuries.

My U.S. Pat. No. 5,576,733 shows an ergonomic mouse with a relatively upright finger engaging side for supporting a hand in a relatively upright position, in which the palm is at a substantial angle relative to a desk. The upright position enables the user to avoid the twisting of the forearm and other deviations required by a conventional horizontal mouse. The ergonomic mouse is adapted for a particular hand, i.e., either the right or left hand. Also shown is an ambidextrous version with a pair of upright, finger engaging sides mirrored about a vertical longitudinal plane. Although about 90% of mouse users are right-handed and only about 10% are left-handed, an ambidextrous version is important because most mice are sold bundled with computer systems, and a bundled mouse must suit all users.

OBJECTS OF THE INVENTION

Objects of the present ambidextrous upright computer mouse are to:

Support a hand in a relatively upright position, so as to avoid causing twisting and other deviations of the hand and arm.

Accommodate both right-handed and left-handed users.

Provide ambidexterity without compromising comfort.

Provide exactly the same feel and comfort for both hands.

Enable fine and precise maneuvering by flexing fingers and thumb, without requiring movement of the whole arm.

Provide right-handed and left-handed sets of buttons which can be alternately disabled.

Further objects of the present invention will become apparent from a consideration of the drawings and ensuing description.

BRIEF SUMMARY OF THE INVENTION

An ambidextrous upright computer mouse includes a relatively upright finger engaging side on one side, and a thumb engaging side on an opposite side. Two sets of buttons are positioned at opposite ends of the finger engaging side. The mouse is symmetrical about a vertical transverse medial plane. When the finger engaging side is on the right side, the mouse can be grasped by a right hand. When the mouse is rotated so that the finger engaging side is on the left side, it can be grasped by the left hand. There is always a set of buttons at the forward end of the mouse, regardless of its orientation. Only one set of buttons is enabled at any time. The sets of buttons are alternately enabled and disabled by moving a selector switch.

DRAWING REFERENCE NUMERALS

| | |
|---|---|
| 10. Housing | 11. Bottom |
| 12. Finger Engaging Side | 13. Thumb Engaging Side |
| 14. Right-Handed Buttons | 15. Left-Handed Buttons |
| 16. Undercuts | 17. Low Friction Pads |
| 18. Motion Sensor | 19. Vertical Transverse Medial Plane |
| 20. Cable | 21. Groove |
| 22. Selector Switch | 23. Selector Switch And Cable Attachment |
| 24. Disc | 25. Conduit |
| 26. Cable | |

DETAILED DESCRIPTION OF THE INVENTION

Figure 1:
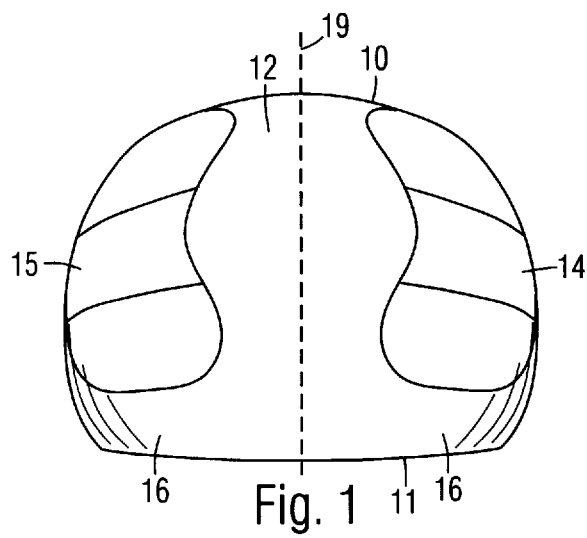
FIG. 1 is a side view of the present ambidextrous upright computer mouse.
Figure 2:
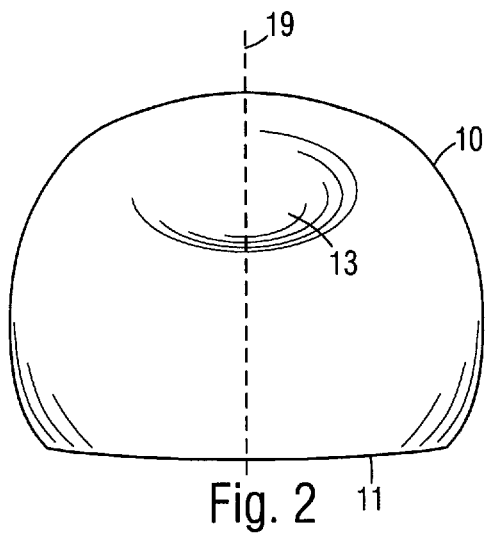
FIG. 2 is an opposite side view.
Figure 3:
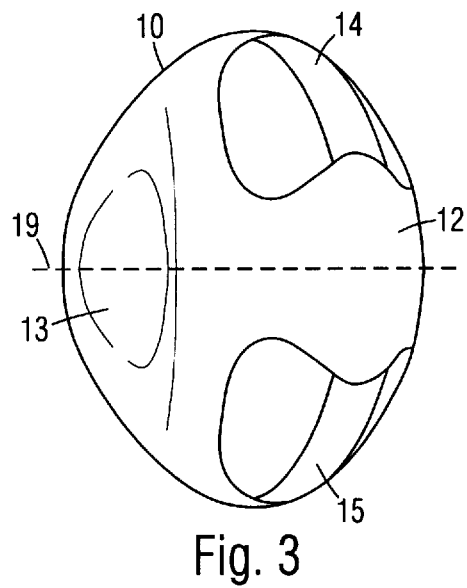
FIG. 3 is a top view.
Figure 4:
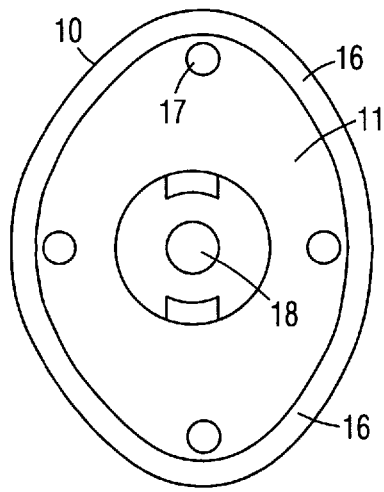
FIG. 4 is a bottom view.

FIGS. 1–6:

In accordance with a preferred embodiment of the invention shown in the opposite side views in FIGS. 1 and 2, and top and bottom views in FIGS. 3 and 4, an ambidextrous upright computer mouse includes a housing 10 with a bottom 11 for translation on a horizontal supporting surface, such as a desk. Housing 10 also includes a finger engaging side 12 on one side and a thumb engaging side 13 on an opposite side. Finger engaging side 12 is extended in a longitudinal direction. A set of right-handed buttons 14 and a set of left-handed buttons 15 are arranged at opposite ends of finger engaging side 12. Each set of buttons is arranged in a vertical column. The lowest buttons are spaced from bottom 11 by shallow undercuts 16. A set of low friction pads 17 and a motion sensor 18, such as a roller ball, are arranged on bottom 11. The internal construction of the mouse may be of any conventional technology well known in the art. Housing 10 is substantially symmetrical about a vertical transverse medial plane 19. The mouse is shown in the top view in FIG. 3 positioned for use by a right hand.

Figure 5:
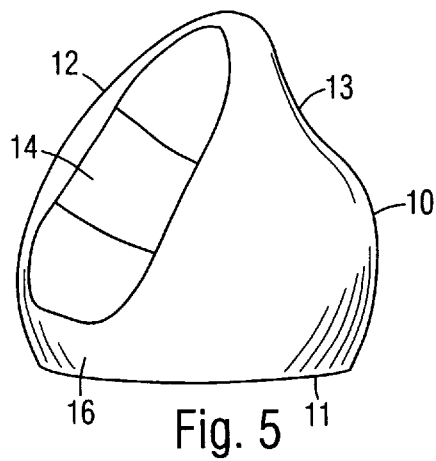
FIG. 5 is an end view.
Figure 6:
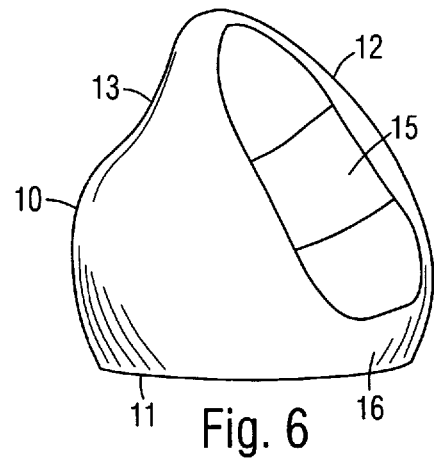
FIG. 6 is an opposite end view.

As shown in the opposite end views in FIGS. 5 and 6, finger engaging side 12 is positioned at a substantial angle relative to bottom 11. The angle is preferably about as shown, but may range from about 40 degrees to about 90 degrees. Thumb engaging side 13 is positioned on the top half of housing 10.

Figure 7:
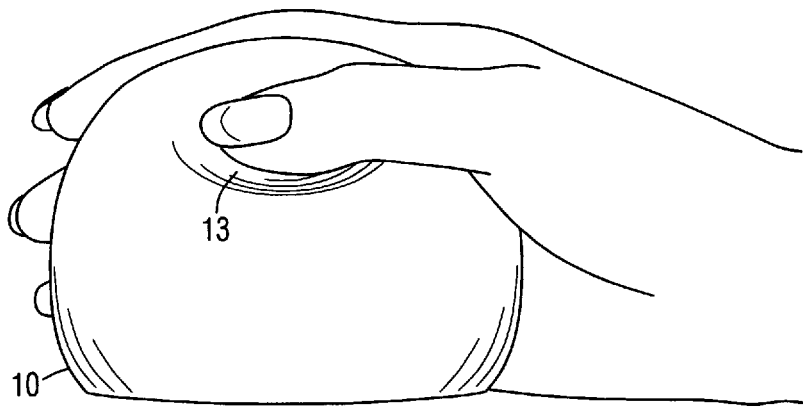
FIG. 7 is a side view of the mouse being grasped by a right hand.
Figure 8:
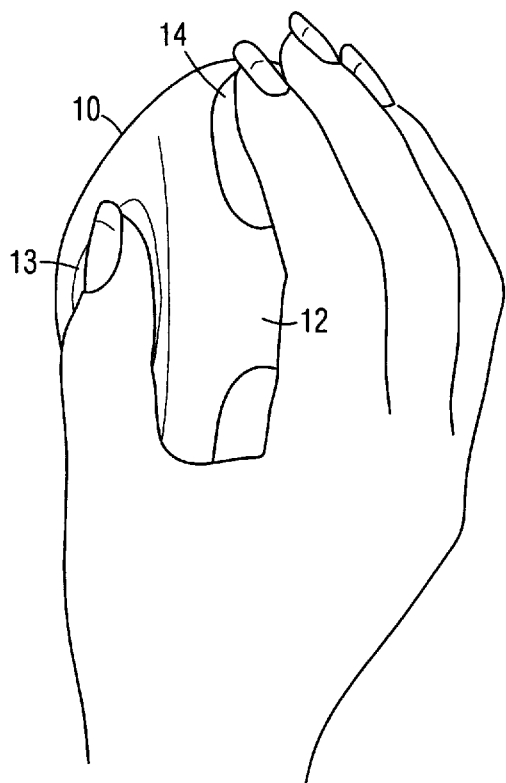
FIG. 8 is a top view of the mouse being grasped by a right hand.
Figure 9:
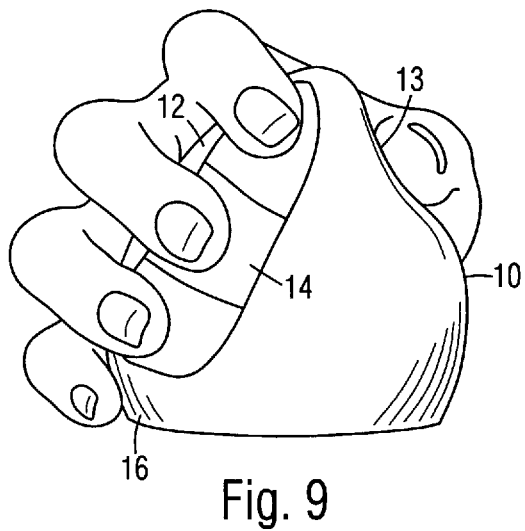
FIG. 9 is an end view of the mouse being grasped by a right hand.

FIGS. 7–9:

As shown in the side view in FIG. 7, the top view in FIG. 8, and the end view in FIG. 9, the mouse is positioned as a right-handed mouse and is grasped by a right hand. Finger engaging side 12 is positioned on the right side. The fingers and palm are supported by finger engaging side 12, and the thumb is supported by thumb engaging side 13. The end of the mouse on which right-handed buttons 14 are arranged is now the front end, so that right-handed buttons 14 are positioned for activation by the fingertips of the right hand.

The hand is supported by finger engaging side 12 in a generally upright position, which avoids the twisting of the wrist and forearm and other deviations required by conventional horizontal mice. Therefore, in the long term, sever discomfort, pain, and injuries may be prevented. Further, ii finger engaging side 12 is long enough to support the fingers in generally extended positions. The mouse can thus be finely and precisely maneuvered by flexing the extended fingers and thumb. Such fine control is not possible if the fingers are substantially curled, such as when grasping a small rod, because curled fingers cannot be flexed. Undercut 16 enables the mouse to be lifted by slightly engaging the top of the little finger.

Figure 10:
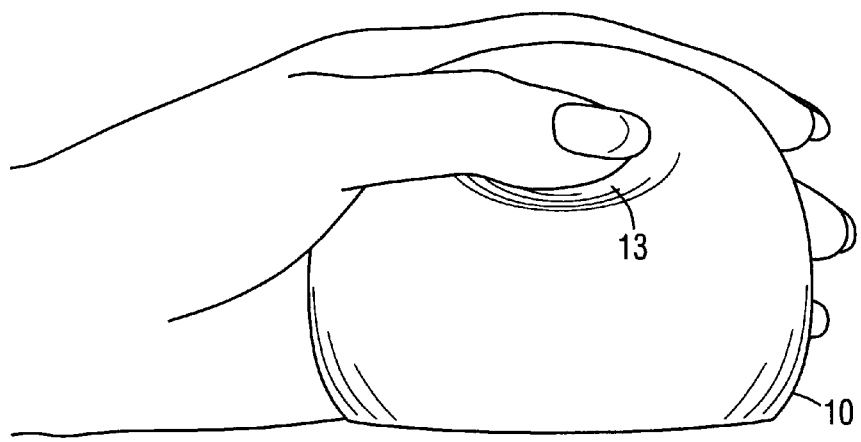
FIG. 10 is a side view of the mouse being grasped by a left hand.
Figure 11:
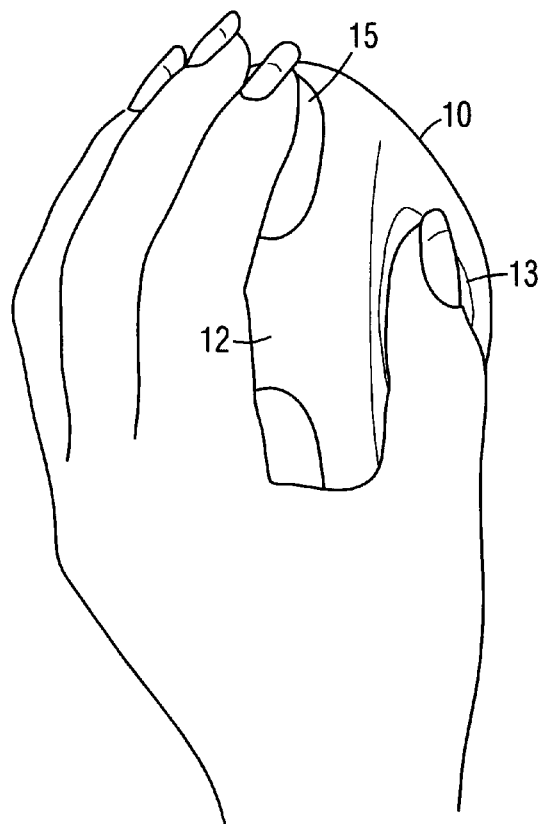
FIG. 11 is a top view of the mouse being grasped by a left hand.
Figure 12:
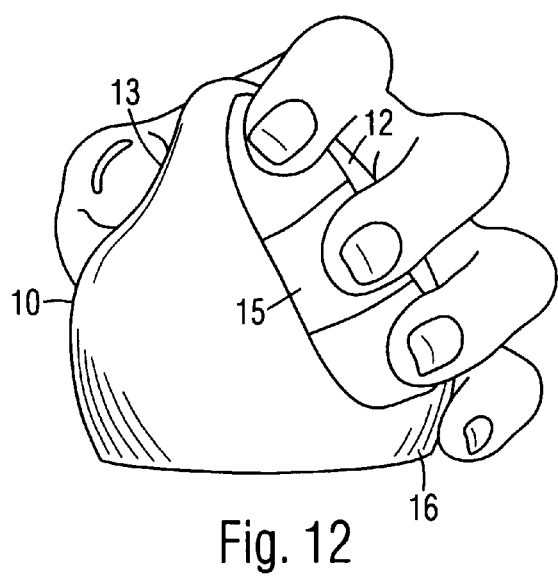
FIG. 12 is an end view of the mouse being grasped by a left hand.

FIGS. 10–12:

As shown in the side view in FIG. 10, the top view in FIG. 11, and the end view in FIG. 12, the mouse is positioned as a left-handed mouse and is grasped by a left hand. Finger engaging side 12 is positioned on the left side. The fingers and palm are still supported by finger engaging side 12, and the thumb is still supported by thumb engaging side 13. The end of the mouse on which left-handed buttons 15 are arranged is now the front end, so that left-handed buttons 15 are positioned for activation by the fingertips of the left hand. Because finger engaging side 12 and thumb engaging side 13 are dedicated to supporting the fingers and thumb, respectively, regardless of whether the mouse is positioned for the right or left hand, they are optimally shaped for their functions. Therefore, the present ambidextrous mouse feels the same as a dedicated right-handed or left-handed upright mouse. Ambidexterity is thus provided without compromising feel and comfort.

Figure 13:
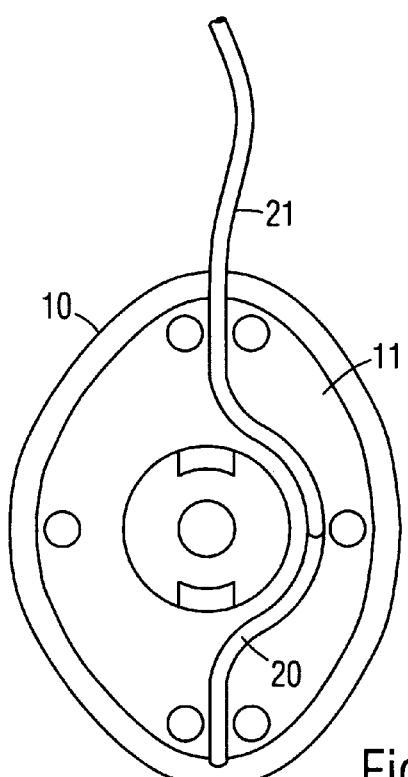
FIG. 13 is a bottom view of one embodiment of a cable attachment.

FIG. 13:

One embodiment of a cable attachment is shown in the bottom view in FIG. 13. A groove 20 is arranged on bottom 11, and extended between opposite ends thereof. A cable 21 is passed through bottom 11 at a medial position in groove 20. Cable 21 can be recessed in an appropriate side of groove 20, depending on whether the mouse is arranged for the right or left hand. Cable 21 is shown arranged for the left hand.

Figure 14:
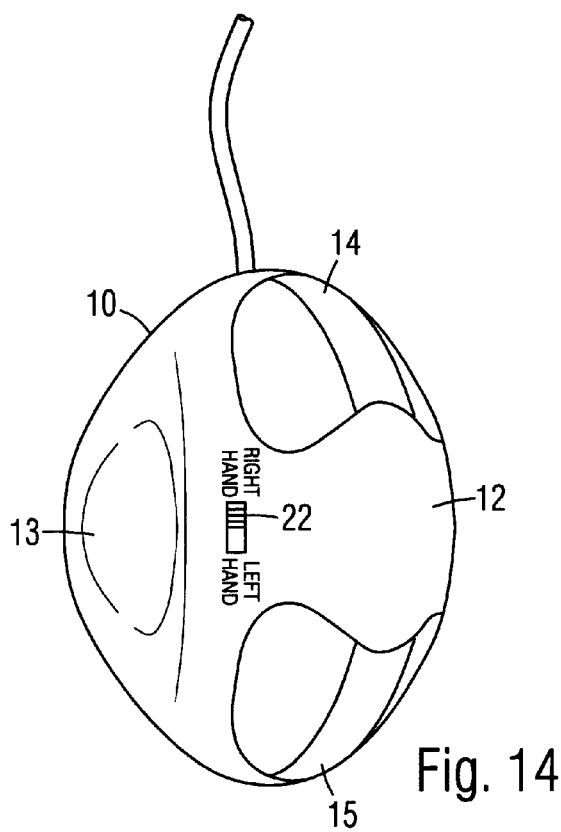
FIG. 14 is a top view of one embodiment of a button selector switch.

FIG. 14:

The two sets of buttons can be selectively disabled, so that only one set is active at any time. For example, when the mouse is positioned for the right hand, left-handed buttons 15 are disabled to avoid accidental activation, and vice versa. Button selection may be accomplished by a selector switch 22, as shown in the top view in FIG. 14. Selector switch 22 may be a slide switch that connects one set of buttons to the circuitry in one position, and connects the other set of buttons to the circuitry in the other position. The positions of selector switch 22 are preferably labeled "Right Hand" and "Left Hand" to enable instant user comprehension.

Figure 15:
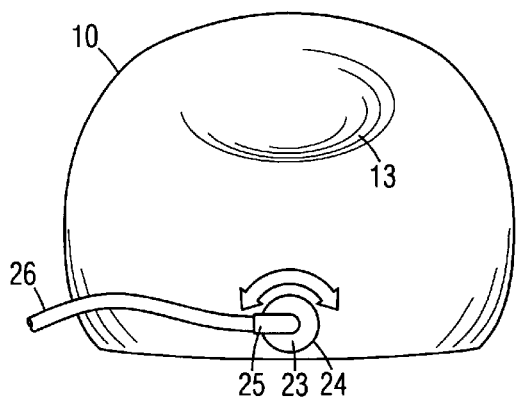
FIG. 15 is a side view of another embodiment of a button selector switch and cable arrangement in a right-handed position.
Figure 16:
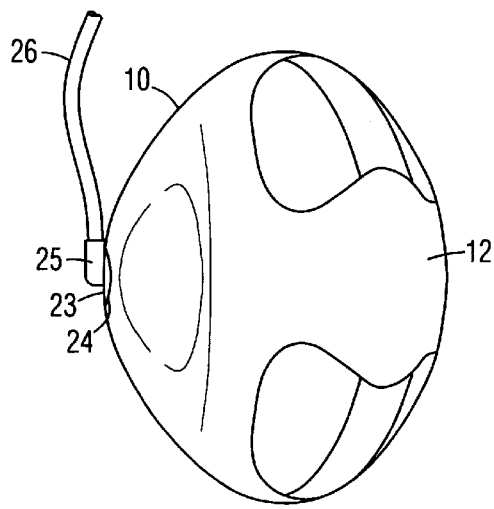
FIG. 16 is a top view of the button selector switch and cable arrangement of the mouse of FIG. 15.

FIGS. 15–18:

A combined button selector switch and cable attachment 23 is shown in the side view in FIG. 15 and top view in FIG. 16. Selector switch and cable attachment 23 includes a rotatable member 24 at a lower medial position of a side of housing 10. A conduit 25 is attached to rotatable member 24, so that a cable 26 extending from conduit 25 is parallel with a longitudinal axis of the mouse.

Selector switch and cable attachment 23 is arranged to operate a suitable electrical switch (not shown) inside housing 10, such as a slide switch, for selecting the buttons.

Figure 17:
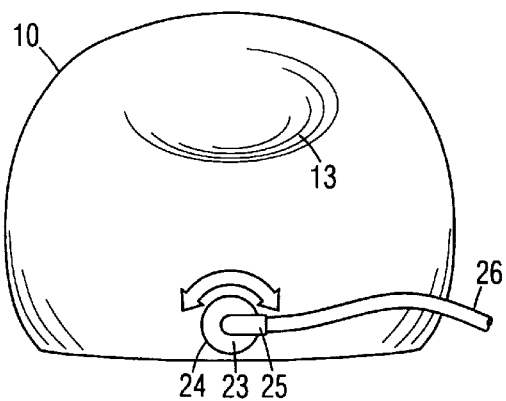
FIG. 17 is a side view of the button selector switch and cable arrangement in a left-handed position.
Figure 18:
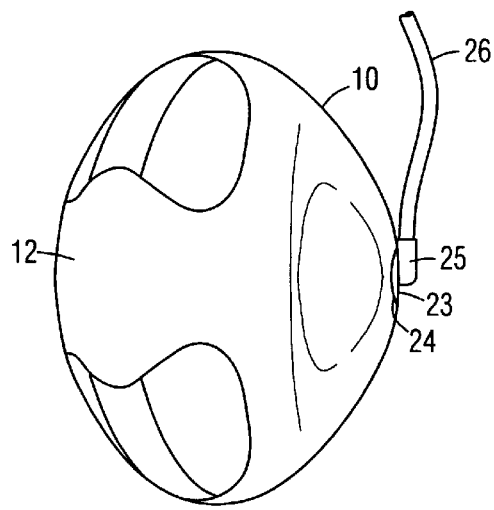
FIG. 18 is a top view of the button selector switch and cable arrangement of the mouse of FIG. 17.

Rotating selector switch and cable attachment 23 to the position shown in FIGS. 15 and 16 positions cable 26 for right-handed use, and automatically selects the right-handed buttons. Rotating selector switch and cable attachment 23 to the position shown in FIGS. 17 and 18 positions cable 26 for left-handed use, and automatically selects the left-handed buttons. An arced, double ended arrow is preferably provided as surface indicia to enable instant user comprehension.

SUMMARY AND SCOPE

Accordingly, an ambidextrous upright computer mouse is provided for being grasped by a relatively upright hand, so as to avoid causing twisting and other deviations of the hand and arm. It can be used by both right-handed and left-handed users. It provides right-handed and left-handed sets of buttons which can be alternately disabled. It provides exactly the same feel and comfort for both hands. It provides ambidexterity without compromising feel and comfort Although the above descriptions are specific, they should not be considered as limitations on the scope of the invention, but only as examples of the embodiments. Many substitutes and variations are possible within the teachings of the invention. For example, finger engaging side 12 can be more or less upright. Finger engaging side 12 can be more or less curved in the longitudinal direction for supporting the fingers in more or less curved positions, respectively. Instead of concave, thumb engaging side 13 can be of other shapes, such as flat, convex, etc. More or fewer buttons can be provided at each end of the mouse. A button can be provided on thumb engaging side 13. Shallow finger grooves can be provided on the buttons. The mouse can be somewhat asymmetrical about vertical transverse medial plane 19 without substantially affecting its feel. The buttons can be differently shaped without affecting the functionality of the mouse. Selector switches 22 and 23 can be arranged to operate a blocking mechanism that physically immobilizes the disabled buttons to prevent them from closing and making clicking noises. Other selector switch mechanisms can be provided. The selector switch may be implemented in software. Button selection may be automated by providing a touch or proximity sensor at each end of the mouse for sensing hand position. The selector switch can be eliminated, so that both sets of buttons are simultaneously enabled. The cord can be eliminated by using conventional cordless technology. Therefore, the scope of the invention should be determined by the appended claims and their legal equivalents, not by the examples given.

I claim:

1. An ambidextrous computer mouse, comprising:

a generally horizontal bottom;

a finger engaging side positioned between about 40–90 degrees relative to said bottom for supporting a palm and a set of fingers of a hand in a position upright enough to substantially improve comfort and reduce the possibility of injury, said finger engaging side having opposite ends aligned along a longitudinal direction;

a thumb engaging side opposite said finger engaging side for engaging a thumb of said hand;

a right-handed button arranged at one of said ends of said finger engaging side; and a left-handed button arranged at another one of said ends of said finger engaging side;

so that when said mouse is oriented to position said finger engaging side toward a right side of a user, said end of said finger engaging side with said right-handed button is a front of said mouse, said right-handed button is thus at said front of said mouse for being activated by a fingertip of a right hand, and when said mouse is oriented to position said finger engaging side toward a left side of said user, said end of said finger engaging side with said left-handed button is said front of said mouse, said left-handed button is thus at said front of said mouse for being activated by a fingertip of a left hand.

2. The ambidextrous computer mouse of claim 1, further including an undercut arranged along a lower edge of said finger engaging side for engaging a top of a little finger and enabling said mouse to be lifted.

3. The ambidextrous computer mouse of claim 1, further including a groove arranged on said bottom and extending between opposite longitudinal ends thereof, and a cable extending into said bottom through said groove, said cable being recessed into said groove so that said cable may extend from either one of said ends of said bottom.

4. The ambidextrous computer mouse of claim 1, further including a selector switch movable between at least two positions, said selector switch enabling said right-handed button and disabling said left-handed button in one of said positions, and enabling said left-handed button and disabling said right-handed button in another one of said positions.

5. The ambidextrous computer mouse of claim 1, further including a rotatable member arranged on one of said sides of said mouse and rotatable between at least two positions about an axis generally perpendicular thereto, and a cable extending from said rotatable member, a proximal end of said cable being generally parallel to said longitudinal direction, said rotatable member positioning said cable toward said right-handed button in one of said positions, and toward said left-handed button in another one of said positions.

6. The ambidextrous computer mouse of claim 1, further including a rotatable member arranged on one of said sides of said mouse and rotatable between at least two positions about an axis generally perpendicular thereto, and a cable extending from said rotatable member, a proximal end of said cable being generally parallel to said longitudinal direction, said rotatable member positioning said cable toward said right-handed button and enabling said right-handed button and disabling said left-handed button in one of said positions, said rotatable member positioning said cable toward said left-handed button and enabling said left-handed button and disabling said right-handed button in another one of said positions.

7. An ambidextrous computer mouse, comprising:

a housing including a finger engaging side with opposite ends aligned along a longitudinal direction, and a thumb engaging side opposite said finger engaging side;

a cable attached to said housing, said cable being selectively securable to said housing to extend longitudinally from adjacent either one of said ends of said finger engaging side so as to avoid interfering with a hand of a user;

a right-handed button arranged at one of said ends of said finger engaging side; and a left-handed button arranged at another one of said ends of said finger engaging side;

so that when said mouse is oriented to position said finger engaging side toward a right side of a user, said end of said finger engaging side with said right-handed button is a front of said mouse, said right-handed button is thus at said front of said mouse for being activated by a fingertip of a right hand, and said cable is selected to be secured at said front of said mouse, and when said mouse is oriented to position said finger engaging side toward a left side of said user, said end of said finger engaging side with said left-handed button is said front of said mouse, said left-handed button is thus at said front of said mouse for being activated by a fingertip of a left hand, said cable is selected to be secured at said front of said mouse.

8. The ambidextrous computer mouse of claim 7, further including an undercut arranged along a lower edge of said finger engaging side for engaging a top of a little finger and enabling said mouse to be lifted.

9. The ambidextrous computer mouse of claim 7, further including a bottom attached to a lower edge of said finger engaging side, said bottom having opposite longitudinal ends, said cable extending into said bottom, said cable being attachable to either one of said ends of said bottom.

10. The ambidextrous computer mouse of claim 7, further including a selector switch movable between at least two positions, said selector switch enabling said right-handed button and disabling said left-handed button in one of said positions, and enabling said left-handed button and disabling said right-handed button in another one of said positions.

11. An ambidextrous computer mouse, comprising:

a finger engaging side with opposite ends aligned along a longitudinal direction, said finger engaging side for engaging a set of fingers of a hand;

a thumb engaging side opposite said finger engaging side for engaging a thumb of said hand;

a cable attached to said thumb engaging side so as to avoid interfering with said fingers;

a right-handed button arranged at one of said ends of said finger engaging side; and a left-handed button arranged at another one of said ends of said finger engaging side;

so that when said mouse is oriented to position said finger engaging side toward a right side of a user, said end of said finger engaging side with said right-handed button is a front of said mouse, said right-handed button is thus at said front of said mouse for being activated by a fingertip of a right hand, and when said mouse is oriented to position said finger engaging side toward a left side of said user, said end of said finger engaging side with said left-handed button is said front of said mouse, said left-handed button is thus at said front of said mouse for being activated by a fingertip of a left hand.

12. The ambidextrous computer mouse of claim 11, further including an undercut arranged along a lower edge of said finger engaging side for engaging a top of a little finger and enabling said mouse to be lifted.

13. The ambidextrous computer mouse of claim 11, further including a selector switch movable between at least two positions, said selector switch enabling said right-handed button and disabling said left-handed button in one of said positions, and enabling said left-handed button and disabling said right-handed button in another one of said positions.

14. The ambidextrous computer mouse of claim 11, further including a rotatable member arranged on said thumb engaging side and rotatable between at least two positions about an axis generally perpendicular thereto, said cable extending through said rotatable member, a proximal end of said cable being generally parallel to said longitudinal direction, said rotatable member positioning said cable toward said right-handed button in one of said positions, and toward said left-handed button in another one of said positions.

15. The ambidextrous computer mouse of claim 11, further including a rotatable member arranged on said thumb engaging side of said mouse and rotatable between at least two positions about an axis generally perpendicular thereto, said cable extending through said rotatable member, a proximal end of said cable being generally parallel to said longitudinal direction, said rotatable member positioning said cable toward said right-handed button and enabling said right-handed button and disabling said left-handed button in one of said positions, said rotatable member positioning said cable toward said left-handed button and enabling said left-handed button and disabling said right-handed button in another one of said positions.

* * * * *